United States Patent Office 3,002,857
Patented Oct. 3, 1961

3,002,857
HIGH TEMPERATURE INORGANIC BINDER AND PRODUCTS PRODUCED WITH SAME
Joseph P. Stalego, Newark, Ohio, assignor to Owens-Corning Fiberglas Corporation, a corporation of Delaware
No Drawing. Filed Nov. 14, 1955, Ser. No. 546,791
7 Claims. (Cl. 117—126)

This invention relates to the manufacture of products formed of siliceous materials, such as fibers of glass, asbestos, rock wool and the like, and flexible, thin films of glass, and to the method for use in the manufacture of same. It relates more particularly to the manufacture of structures of such siliceous materials coated or bonded with a composition which is inorganic in character thereby to enable fuller utilization of the desirable thermal characteristics of the glass fibers and films and other siliceous materials without loss of inertness, strength, electrical resistance and many of the other desirable properties of such materials.

A simplified diagram of the process is as follows:

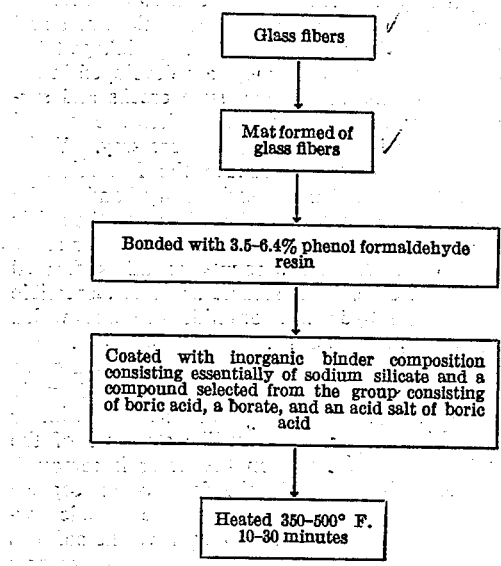

Referring to the use of glass fibers, as representative of the siliceous materials use has been made primarily of organic resinous systems for coating or bonding the glass fibers in the manufacture of coated fibers and fabrics, bonded insulation products and molded plastics and glass reinforced laminates.

Such organic resinous systems have been satisfactory where the formed glass fiber structures are employed under temperature conditions which do not exceed the point at which the organic materials become thermally unstable, usually at or about 350° F. for most organic materials. The limitation imposed by the use of such organic resinous materials sacrifices one of the important advantages in the selection of glass fibers and films over and above the wide variety of other materials available on the market in the manufacture of various products.

In addition to the high strength, good flexibility, good electrical resistance, relative inertness, resistance to attack by elements normally existing in the atmosphere, and good thermal insulation characteristics, glass fibers and films are resistant to deterioration or attack up to temperatures which will cause fusion of the glass composition of which the fibers and films are formed up to about 1300–1500° F. for most silica glasses which are used in the manufacture of glass fibers. Thus the limitation for use at a temperature below 350° F. imposed by the reliance on an organic resinous system for coating or bonding the siliceous fibers or films fails to take advantage of a property which, if it could be made available, would lead to new fields of industrial and domestic use.

For many years, experts in the field have been searching for a material or materials capable of developing and maintaining a strong bonding relationship with glass fibers without causing deterioration or other undesirable characteristics of the glass fibers and in which neither the bonding relationship or the material itself deteriorated during exposure to elevated temperatures, even up to temperatures of fusion of the glass composition of which the fibers are formed. Various systems have been tried, some of which have been found to be satisfactory for certain applications while others have fallen down on one property or another but no generally applicable system has been developed for use in the manufacture of a high temperature inorganic binder adapted for universal use with glass fibers.

Some of the first attempts have been based upon the combinations of glass fibers with cementitious materials as the binder. While such combinations are acceptable in the fabrication of rigid insulation and molded products such as blocks, panels or boards, the glass fiber-cementitious systems are limited by the amount of glass fibers that can be incorporated and the products that are formed are uniformly inflexible and brittle with the result that such systems cannot be used in the fabrication of a great many products which are now being produced with the less desirable organic resinous binders.

Attempts have also been made to use water glass or sodium silicate as the binder component in the manufacture of coated or bonded glass fiber structures. The high sodium ion concentration in sodium silicates commercially available causes deterioration and attack of the glass fibers with the result that the products that are formed are weak and brashy and are subject to many of the same limitations as are present in the use of cementitious materials from the standpoint of strength, flexibility and brittleness.

From my investigations, coupled with the extensive researches which have been reported by others, it has become possible by projection to formulate the conditions which it is desirable to have existing in a suitable composition for use as an inorganic coating or binder for glass fibers, glass films, or other siliceous fibers. From this base, it has been possible to prepare compositions which are inorganic in character and which can be used successfully with glass fibers and films and other siliceous fibers as a binder or as a coating material in the fabrication of coated fibers and fabrics and molded plastics or laminates and insulation products having temperature stability up to about the fusion temperature of the glass composition of which the fibers are formed and which utilizes the flexibility, the strength properties, the inertness and the insulation characteristics of the glass and other siliceous fibers and films to the fullest extent possible, at least by comparison with their utilization in the binder systems previously employed using organic resinous binders or inorganic cementitious or sodium silicate binders.

It is an object of this invention to produce a binder composition of the type described for use with glass fibers and films and other siliceous fibers in the manufacture of coated fibers and fabrics and in the manufacture of bonded structures and it is a related object to provide coated fibers and fabrics, molded plastics and laminates and bonded glass fiber structures in which use is made of a thermally stable inorganic binder and to provide a method for producing same.

Some of the properties towards which the formulations were directed in the preparation of an inorganic coating and binder composition for glass fibers and films may be set forth briefly as follows:

(1) The materials in the composition forming the binder should be capable of development of a good bond with the surfaces of the glass fibers or film at a temperature below the fusion temperature of the glass composition of which the fibers are formed. This bonding relationship should be developed in a relatively short time of about ¼ to 60 minutes and at a temperature below 1200° F. and preferably within the range of 600–1200° F.

(2) The binder or coating should be unaffected by moisture and resistant to swelling under moisture conditions after the binder has been set on the surfaces of the glass or other siliceous material.

(3) It should not attack the glass fibers, as does sodium silicate, when in the form of a composition applied to the surfaces of fibers or films or when set thereon as a coating or binder and it should not deleteriously affect the strength, the flexibility and other desirable characteristics of the fibers or films.

(4) The inorganic binder composition should not be corrosive to metal nor toxic and it should enhance the hand and feel of the structure that is formed of the glass fibers.

(5) The composition should be capable of formulation with low cost and readily available raw materials and it should be capable of application with existing equipment to produce an improved product without increase in the cost thereof.

The development and the maintenance of the good bonding relationship between the coating and binder and the surfaces of the glass fibers or films has been found to depend on the ability of the coating or binder to react with elements present on the surfaces of the glass fibers or film but the reaction should not be such as to change the characteristics of the glass fibers or film or cause deterioration in its flexibility or strength properties thereof. It is in this regard mostly that both sodium silicate and cementitious materials fail in their use as a binder for glass fibers.

In addition, to develop the desired bonding relation without modification of the fibers to destroy the desirable characteristics thereof and to enable formation of the materials to a desired shape for cure, such as by molding, it has been found that the composition should be caused to remain chemically reactive over a period of time, such as for days, in the fabrication of bonded or molded insulation products of glass fibers or other siliceous wool fibers.

Using these prerequisites and projections as a basis for operation, I have found that in the formulation of an inorganic, high temperature binder and coating composition for use with fibers and films of glass and other siliceous materials, use should be made of an aqueous system containing materials in combination capable of reaction on the glass fiber surfaces at the temperatures of cure to form a glass-like material which is able strongly to bond to the surfaces. In accordance with this concept, the glass-like material should be formed of the oxides of metals found in glasses, such as one or more of the oxides of aluminum, silicon and boron as the primary elements with further improvements being secured by the use also of the oxides of calcium, magnesium, sodium and iron as secondary elements. Still further improvement has been found to result by the inclusion of one or more of the water soluble or water dispersible compounds of lead, zinc, copper, cadmium, indium, tin, antimony, barium, molybdenum and chromium as additional elements. Since the oxides themselves are usually not reactive or capable of forming a bond with glass fibers at normal curing temperature, use cannot be made of the metal oxides per se in the binder composition. It becomes necessary to formulate the binder with the respective metals present in the form of water soluble or water dispersible hydroxides, salts, or other compounds which upon drying or under the conditions of cure will be converted easily to the oxide with the thought of forming a metal-oxygen-metal linkage between the elements in the binder and elements present on the surfaces of the glass to integrate the coating and binder with the glass in the manner somewhat similar to that in which the glass itself is formed, but preferably by a reaction which takes places at a much lower temperature.

The inorganic portion of the binder may consist of any of the elements commonly used to make glass, such as sodium silicate, silicic acid, lead borate, aluminum hydroxide, aluminum borate and other calcium, potassium and lithium compounds. The purpose would be to secure as intimate a mixture of the chemically reactive elements as possible so that they may be fused to form a ceramic bond with the glass.

In the phase of the invention which will hereinafter be described, the binder and coating composition is based upon the use of silicic acid as the essential component for reaction with groupings existing on the surfaces of glass fibers and films and certain other components to achieve a bonding relationship with the surfaces of the glass fibers and films and for reaction with other components on the glass fiber surfaces to form the inorganic glass-like coating or binder.

Use can be made of silicic acid alone. However, when used alone, it has been found to be almost too reactive since it forms a bond with the surfaces of the fibers and films of glass which is so strong that when shrinkage takes place upon drying, numerous cracks are developed in the coating. In those instances when such cracks and surface roughness are acceptable and even desirable, as will hereinafter appear, modification is unnecessary. While many ways are available to reduce the formation of cracks, it has been found that a satisfactory bond can be achieved without the formation of cracks when the silicic acid is dispersed or diluted in the coating or binder as by the addition of substantial amounts of fillers formed chiefly of clays or other water soluble or water dispersible silicates, carbonates, hydroxides or oxides of metals which are usually found in glass, as previously pointed out.

In a phase of the invention which will hereinafter be more specifically described in this application, use is made of a borate in combination with the silicic acid, with or without the filler, to form a glass-like structure of the oxides of silica and boron when the water is removed. When the borate is present in the form of an organic borate, as will hereinafter be described, the organic portion of the compounds functions to improve the softness and the hand of the fibers and film of glass. The organic portion will be eliminated slowly at elevated temperature by thermal decomposition to leave the boro-silicate binder as a final product.

To keep the binder moist and workable before curing to improve the hand and processing characteristics of the cured product, organic materials can be incorporated in a desired amount into the basically inorganic system. It is preferred to make use of a humectant or a hygroscopic material for this purpose, such as represented by glycerine, ethylene glycol or other polyglycols or polyhydric alcohols, but use can be made also of synthetic materials such as a thermosetting resin, thermoplastic resin, or else use can be made of a wetting agent or organo metallic compound.

Instead of making use of silicic acid as such as the principal component of the binder, it has been found that use can be made of the less expensive sodium silicates but that it is necessary either to formulate the sodium silicate to embody a lesser sodium to silica ratio which is below 1 to 10 or else to modify the sodium silicate to neutralize or inactivate the sodium ion to prevent the type of attack on the glass fibers which has been experienced in the unsuccessful attempts which have heretofore been made to use sodium silicates in binder compositions having a normal sodium to silica ratio of about 1 to 3.2. For example, use can be made of sodium silicate treated by ion exchange to reduce the sodium to silica ratio to below 1 part of sodium to 10 parts of silica and preferably down to 1 part by weight of sodium to 100 parts silica, or else formulated to the desired ratio.

A binder composition containing the desired characteristics has been formulated in accordance with the preferred practice of this invention by modification of commercial sodium silicate with materials in the binder or coating composition which will neutralize the sodium or which will buffer the sodium ion to reduce the activity thereof and form silicic acid and other compounds of the glass forming type. An important concept of this invention resides in the formulation of an inorganic high temperature binder wherein sodium silicate is used in combination with boric acid which react in the system to form some sodium borate and some silicic acid amongst other intermediate and complex compounds as indicated by the following equation:

$$3NA_2SiO_3 + 2H_3BO_3 \rightarrow 2NA_3BO_3 + 3H_2SiO_3$$

Instead of boric acid, use may be made of compounds containing aluminum ions such as aluminum hydrate, or use can be made of other inorganic acids for neutralizing the sodium, such as hydrochloric acid, sulphuric acid, phosphoric acid, chromic acid and the like, in amounts sufficient to neutralize the sodium and form silicic acid in the composition. In general, sodium silicate can be used in any system of the type described wherein such compounds are added to reduce the pH of the composition as it appears on the fiber surfaces to below 10 and preferably to below a pH of 9–9.5.

By neutralizing the sodium ion with boric acid or with other organic borates, metallic borates, ammonium borates and the like, a binder is formed containing sodium borate and silicic acid, as previously indicated, along with other materials such as sodium borosilicate and other borosilicates, especially when the boric acid and the like compound is present in amounts substantially greater than the sodium silicate, as in the preferred concepts of this invention.

With the addition of aluminum ions in the form of organic aluminates, aluminum hydrate, aluminum salts, an even better binder composition can be obtained since the aluminum operates to take up some of the sodium of the sodium silicate. In this same sense, still further improvements can be obtained in the binder composition when it is formulated to include other water soluble or water dispersible compounds of such metals as lead, zinc, copper, scandium, cadmium, indium, tin, antimony, bismuth, strontium, barium, molybdenum and chromium. Whether or not a glass is actually formed upon reaction at elevated temperatures for cure, the aluminum, boron and group ions react with the sodium to tie it up chemically and prevent attack on the glass fibers. The other metallic ions appear to react with ions or groups available on the surfaces of the glass to produce a barrier coat which seems to make the fibers more durable and more resistant to heat and alkali attack and weathering.

When use is made of sodium silicate (or other alkali silicates such as those of potassium and lithium) as the source of silicic acid, the borate is preferably incorporated in the form of boric acid, ammonium fluoborate, or other acid salts of boron for reaction to neutralize the sodium in the silicate. When the silicic acid component is incorporated in a form other than that which requires neutralization of the sodium ion, the borate can be incorporated as a water soluble or water dispersible salt as in the form of a metallic borate or an organic borate salt but it is preferred to incorporate the borate in the form of a condensation reaction product between boric acid, urea, glycol and formaldehyde, as described in my copending application Ser. No. 474,617, filed December 10, 1954, hereinafter referred to as an "organic borate." When use is made of an organic borate, the organic component lends resiliency and hand to the product that is formed and the organic borate prevents punking of the binder at elevated temperatures. Instead of the borates and boric acid, use can be made of phosphates and phosphoric acid, aluminum hydrates and the like.

As the fillers, use can be made of clays such as kaolin clay, bentonite, Canary clay, and other silicates, carbonates, oxides or hydroxides, especially of metals such as boron, aluminum, lead, zinc, tin, copper, cadmium, scandium, indium, antimony, bismuth, strontium, barium, molybdenum and chromium. Use can also be made of additional low density aggregates of the siliceous type such as exfoliated vermiculite or perlite. When sodium silicate is used in the binder composition, it is preferred to make use of a clay which has hydrogen ions in exchange for sodium ions to reduce the concentration of sodium ions in the binder and minimize the possibilities for attack or deterioration of the glass fibers. Clays having such ion exchange characteristics are found primarily amongst the aluminum clays as represented by kaolin clay, permutite, bentonite, chabozite, montmorillonite, illite and the like.

In the formulation of the binder composition with sodium silicate, it is preferred to make use of sodium silicate and boric acid in the ratio of 1 part by weight of sodium silicate to 0.5–10 parts by weight of boric acid although the amount of boric acid may be varied from 0.1 to 100 parts by weight to 1 part by weight of sodium silicate. When silicic acid is used or when the sodium silicate is otherwise neutralized or subject to ion exchange to form silicic acid, the ratio of materials may range from 1 part by weight of silicic acid to 0.5–5 parts by weight of a borate in the form of the organic borate or other salts containing borate, phosphate or aluminum hydrate.

When present, the amount of inorganic filler in the binder composition is based on the combined weight of the silicate or silicic acid or the combined weight of the silicate or silicic acid with the borate. In formulation of an inorganic coating composition with inorganic fillers, the materials are combined in the ratio of 1 part by weight of the silicate, silicic acid or borate or its substitute up to 30 parts by weight of filler. It is preferred to maintain the materials within the ratio of 1 part by weight of the binder components including the silicic acid alone or silicate and borate to 1–10 parts by weight of the filler.

In the system which makes use of sodium silicate and boric acid or other acid salts and compounds of glass forming elements added to the silicate to neutralize the sodium ion and prevent attack on glass, it will be understood that the acids, acid salts of compounds of glass forming elements will also react with groups present on the surfaces of the fibers or films of glass. The reaction appears to be limited to one of a surface reaction which does not adversely affect the strength of the fibers or film and the reaction product formed on the surfaces of the glass appears to function as a barrier to the penetration or destruction by the sodium ions, especially under elevated temperature conditions.

The boric acid apparently reacts with the silica, aluminum, calcium, magnesium and potassium present on the surfaces of the fibers or films of glass and the silicic acid which is present also reacts with the elements present on the surfaces, as previously pointed out, to effect a strong bonding relation. Within the binder composition itself, sodium borate and silicic acid are formed as previously pointed out and, in addition, sodium borosilicate and borosilicate compounds are formed by reason of the presence of higher ratios of boric acid to sodium silicate which are employed. Both the boric acid and sodium silicate etch the surfaces of the fillers when added when such fillers are added to increase solids and to take up sodium and to disperse the silicic acid, to form complex compounds of the glass forming variety with aluminum silicate. When other acids, acid salts or compounds of glass forming elements are formulated with the sodium silicate, similar reactions are believed to be secured.

For comparison, a binder composition formulated of 46 parts by weight sodium silicate (Diamond Alkali Company) and 34 parts by weight of boric acid was employed under the same conditions as a binder composed solely of the sodium silicate in the preparation of a bonded mat of glass wool fibers. The product formed of sodium silicate was weak and brashy and it was incapable of being rolled into a compact bundle. On the other hand, the mat bonded with a combination of sodium silicate and boric acid appeared to be well bonded and strong and it was sufficiently flexible to enable the mat to be rolled easily into a desired bundle.

When sodium silicate is employed in substantial amounts in the treating composition and use is made of boric acid or phosphoric acid to form the silicic acid, and to provide the metal oxide used in glass formation, still further improvements are secured by the further modification to include an aluminum ion in the form of an organo aluminate or other water soluble or dispersible salts of hydroxides of aluminum and it is even better when still other water soluble compounds or water dispersible compounds are employed, as previously pointed out, which include such metals as lead, zinc, tin, cadmium, copper, indium, antimony, bismuth, strontium, barium, molybdenum and chromium. The aluminum, boron, chromium and molybdenum function in a manner previously described to tie up the sodium ions and prevent attack on the glass fibers while the other metals react in combination with the ions on the surfaces of the fibers and films of glass to increase their durability and to make the products more resistant to heat and attack by alkali. These additive materials tie up the sodium ion with silicic acid to form a glass of the type suggested as desirable for use as a coating or binder for glass.

The following examples are given by way of illustration, but not by way of limitation, of the various embodiments of this invention:

Example 1

Binder composition:

1 part by weight of silicic acid
1 part by weight of organic borate (condensation product of boric acid, urea, glycol and formaldehyde) (Tybon 5411)
1 part by weight of Canary clay The materials are combined in an aqueous system to provide a binder composition containing about 30 percent solids.

Application of the binder composition was made to a mat of glass fibers previously bonded with 3.5–6.4 percent by weight of phenol formaldehyde resin based upon the weight of glass fibers. The amount of binder composition applied was sufficient to introduce from 20–30 percent by weight of the inorganic binder solids based upon the weight of the final product. The product was baked at a temperature of about 350–500° F. for from 10–30 minutes.

The phenol formaldehyde resin functions in the formed product to prevent undue swelling at high temperatures and it also gives improved handling characteristics and tends to prevent the dusting of the inorganic binder. Instead of applying the phenol formaldehyde resin to the glass fibers in advance of the inorganic binder, the synthetic organic resinous component can be incorporated as a part of the inorganic binder composition in substantially equivalent amounts for application onto a mat of glass fibers by way of a single treatment. Phenolic also prevents undue swelling under high humidity conditions at any temperature. The amount of phenolic resin or other synthetic organic resinous binder and inorganic material can be varied over a fairly wide range but it is preferred to make use of the inorganic binder solids in amounts greater than the organic resinous component to achieve the desired results of high temperature stability. In fact, it is preferred to make use of the inorganic components in the ratio which is greater than 2 parts by weight of the inorganic binder solids to 1 part by weight of the organic resinous material.

In these systems, the silicic acid provides the bond and the borate tends to prevent punking by bubbling up to insulate the phenol formaldehyde binder droplets at the fiber intersections.

Example 2

13 parts by weight of synthetic organic resin
13 parts by weight of organic borate (Tybon 1018)
29 parts by weight of silicic acid
45 parts by weight of Canary clay Example 3

10 parts by weight of Vinsol extended phenol formaldehyde resin
10 parts by weight of organic borate
6 parts by weight of glycerine
30 parts by weight of silicic acid
44 parts by weight of Canary clay Example 4

15 parts by weight of organic borate
30 parts by weight of silicic acid
10 parts by weight of polyethylene glycol (300–1000 molecular weight)
45 parts by weight of bentonite Example 5

70 parts by weight of sodium silicate
90 parts by weight of boric acid
1000 parts by weight of kaolin clay Example 6

90 parts by weight of sodium silicate
90 parts by weight of boric acid
1000 parts by weight of kaolin clay Example 7

120 parts by weight of sodium silicate
90 parts by weight of boric acid
1000 parts by weight of kaolin clay Example 8

160 parts by weight of sodium silicate
80 parts by weight of boric acid
1280 parts by weight of kaolin clay Example 9

80 parts by weight of sodium silicate
40 parts by weight of boric acid
1280 parts by weight of clay Example 10

100 parts by weight of sodium silicate
200 parts by weight of boric acid
1200 parts by weight of bentonite Example 11

100 parts by weight of sodium silicate
600 parts by weight of filler

Example 12

100 parts by weight of sodium silicate
250 parts by weight of aluminum hydrate

Example 13

100 parts by weight of sodium silicate
400 parts by weight of siliceous clay filler having available hydrogen ions
200 parts by weight of magnesium hydroxide

Example 14

200 parts by weight of sodium silicate formed of the ratio of 1 part by weight sodium to 20 parts by weight silica Each of these formulations can be diluted with water in amounts to provide a composition containing from 15–35 percent by weight solids depending upon the use which is to be made of the binder or coating composition. Application is made to the glass fibers in the form of fibers, mats, batts or fabrics by a saturation process such as by immersion, flow coating, flooding the surface of the fibrous structure or the like to achieve uniform distribution throughout. Any excess binder is removed by suction from the underside.

Depending upon the character of the fibrous structure and the density desired in the mass, the amount of solids remaining on the glass fibers can be varied from 2 percent up to as much as 40 percent by weight, based upon the final product.

Where an organic resinous binder is present as an interim binder, the temperature for cure may be sufficient only to eliminate the moisture to achieve bonding by reaction through the silicic acid. Additional bonding by glass formation at high temperature can be achieved by reliance on the high temperature in use to react the materials to form the inorganic binder prior to thermal decomposition of the interim organic system. When the fibers are molded to a desired shape, as in the manufacture of pipe insulation, a temperature up to 1200° F. and preferably in the range of 600–1200° F. for from ¼ to 15 minutes may be employed to eliminate the moisture and set the materials.

Compositions of Examples 5, 6 and 7 will illustrate the improvement which is secured by the use of higher concentrations of boric acid in combination with sodium silicate. 10 percent deformation in compression was secured in the product of Example 7 having a density of about 9 pounds per square foot under a load of about 400 pounds per square inch. This is to be compared with the improvement which is secured in which a load of 420 pounds per square inch was required for equivalent deformation of the product molded with the composition of Example 6, having a density of 9.6 pounds per square foot or which required a load of 490 pounds per square inch for 10 percent deformation of the product formed of the composition of Example 5 having a 10 pound per square foot density.

In the product formed by the use of the compositions of Examples 8 and 9, the conventional autoclave tests indicated that a bonding relationship was developed with glass fibers which was equivalent to that capable of being achieved by the use of silicic acid alone. In the standard boiling test, a pH of 9–9.5 was secured at the glass fiber surfaces as compared to a pH of 10.5 for standard board bonded with a phenol formaldehyde resinous material. By way of a further observation, it has been found that little, if any, alkali attack is secured in the use of binder compositions formulated to contain sodium silicate when the pH of the binder composition is maintained below 10.

The product formed is able to withstand temperatures in excess of 1000° F. without deterioration in the bonding relation. The product is non-dusting. The binder compositions appear to be hydrophilic in character since they substantially completely wet out the surfaces of the glass to provide a basis for the development of an improved bonding relation.

The inorganic hydroxide in Example 13 can be replaced in whole or in part by the hydroxides, carbonates or oxides of one or more of such other metals as lead, zinc, copper, scandium, cadmium, indium, tin, antimony, bismuth, strontium, barium, molybdenum and chromium.

Because of the excellent bonding relationship which is capable of being established between glass fiber surfaces and silicic acid, employed alone as a base or in the combinations described, many new and novel applications and uses are possible to form new and improved products as illustrated by the following further examples.

Example 15

In the use of glass fibers in the manufacture of battery separators having the desired porosity and mass integrity, application can be made of silicic acid alone as the binder for the glass fibers since it is not reactive with the battery acids and since it is able strongly to bond the fibers one to another without loss of utility because of any cracks which might form in the silicate coating.

In such application, silicic acid, such as "Ludox" or "Syton," marketed by Du Pont de Nemours & Company and Monsanto Chemical Company, respectively, may be employed in concentrations ranging from 20–40 perecent or more for application onto the mat of fibers followed by drying at room temperature or preferably at a temperature within the range of 350–600° F. for from 1–30 minutes or more to set the silica for bonding the fibers. Additions to provide an amount of silica ranging from 10–40 percent by weight of the battery separator are sufficient, depending upon the density of the separator.

Example 16

In the manufacture of glass fiber reinforced plastics and laminates in which use is made of an organic resinous material as the substantially continuous phase of the system, greater utility can be derived from the presence of glass fibers when the fibers are treated in advance with a silicic acid system. The silicic acid sets on the glass fiber surfaces when applied in small amounts to form a roughened surface which leaves more surface area for contact with the resinous material and the formed surface roughness coupled with the modification in surface characteristics of the fibers provides for an improved bonding relationship between the resinous phase and the glass thereby to enable fuller utilization of the strength properties of the glass fibers in reinforcing the molded plastics or laminates. In practice, glass fibers ¼ inch in length having silicic acid in an amount ranging from about 2–15 percent by weight on the surfaces thereof provide reinforcement in strengths equivalent to that secured by the use of ½ inch glass fibers in equivalent amounts since slippage between the resin and glass is materially reduced by the silica.

For this application, only a small amount of silicic acid is necessary to give the desired results. Such small amounts which range from about 2–15 percent do not interfere with the utility of the glass fibers as a strengthening agent in plastics or coated fabrics.

Example 17

In the sizing of the glass fibers to improve their processing and performance characteristics during the fabrication of strands, yarns and fabrics thereof, the addition of silicic acid to the size composition even in amounts as small as 0.1–1 percent by weight have been found effective to improve the integrity of the strands and yarns formed of the fibers. The presence of silicic acid in the size composition appears to function in a manner which enhances the wetting out of the fibers and thus improves the bonding relationship and the integrity of the strands and yarns that are formed.

The use of silicic acid in a size composition is especially beneficial in a size formulated to contain a saturated polyester resin as the film former and an organo silicon compound such as a silane, silanol or polysiloxane, preferably having an unsaturated organic group as the anchoring agent. A composition of the type described is represented in the copending application Ser. No. 313,783, filed October 8, 1952, and it may be further represented by the following size composition:

4 percent by weight of a saturated polyester resin
0.2 percent by weight of a vinyl trichlorosilane or sodium vinyl polysiloxanolate 0.025 percent by weight of pelargonate acid solubilized with acetic acid
0.2 percent by weight silicic acid
95.35 percent by weight of water In the above size composition, an oleaginous lubricant in amounts up to 2 percent by weight may be employed and use may also be made of a water soluble colloid such as gelatin, polyvinyl alcohol, starch, casein, carbowax and the like in an amount ranging from 0.1–1 percent by weight.

Equivalent improvement will be secured by the inclusion of silicic acid in an amount ranging from 0.1–2.0 percent by weight in other size compositions which are applied in the usual manner to glass fibers for securing the desired balance between lubricity and bonding.

Example 18

In the fabrication of a bonded mat, such as by the process of feeding a plurality of continuous strands of glass fibers onto the surface of a laterally traveling belt but at a rate faster than the linear speed of the belt, whereby the strands form into loops which overlap to form a swirl pattern, application as by spraying a solution of silicic acid onto the fibers during the wetting down process markedly improves the characteristics of the mat from the standpoint of its strength and bonding properties. The application of silicic acid may be made in conjunction with the use of the ordinary synthetic resinous binders, such as formulated of phenol formaldehyde resin, Vinsol extended phenol formaldehyde resin, urea formaldehyde resin and the like, or use may be made independently thereof. When applied as an additive with other binders, an amount of silicic acid corresponding to 2–5 percent by weight of the total binder solids may be employed. When applied independently of any other binder, a large amount of silicic acid in the range of 3–30 percent by weight should be applied. When used alone, an oleaginous lubricant in amounts ranging from 0.2–2.0 percent by weight and a small amount of a film forming resin up to about 5 percent by weight of the binder solids may be combined with the silicic acid to improve the hands of the glass fiber product. Drying may be carried out in the usual manner but it is preferred to employ a temperature up to about 600° F. when silicic acid alone is used or a temperature in the range of 350–600° F. when substantial amounts of organic material are present.

Example 19

In the manufacture of a thermally stable bonded glass wool product use is made of a formulation containing the following ingredients diluted with water to a solids content of about 25 percent by weight:

13 parts by weight of phenol formaldehyde (A or water soluble stage)
13 parts by weight of urea borate (Tybon 5411)
74 parts by weight of silicic acid A saturation process is employed to achieve proper and uniform distribution of the binder throughout the glass wool batt. Excess binder is removed by suction or by extended drainage. It is desirable to provide for a retention of the inorganic binder in amounts of about 10–30 percent by weight based upon the weight of the final product.

The product is cured, with or without molding, by heating to a temperature in the order of 600° F. for about 15 minutes.

Example 20

Use can be made of silicic acid formulated as a coating for products that are formed of glass fibers to improve the appearance thereof, as in a paint, or to improve the characteristics of an already formed product, such as a molded panel, tile or thermal insulation. Boards which are already bonded with a silicic acid or a modified silicic acid binder, in accordance with the previously described concepts, can be painted or coated with a composition based upon the use of silicic acid as the binder and which embodies fillers in the ratios of 1 part by weight silicic acid to 1–10 parts by weight of filler and which embodies pigments in amounts sufficient to give the desired color intensity. Upon drying, the silicic acid bonds chemically to the surfaces of the glass to improve the appearance of the board and to increase the heat resistance of the coated structure. In a paint or coating composition of the type described, the composition may be formulated to contain solids sufficient to give flow of the desired character, usually about 15–40 percent by weight of solids.

Example 21

In the manufacture of fire resistant barriers and structural boards of glass wool fibers bonded with organic resinous materials or with silicic acid or modified sodium silicate binders, in accordance with the practice of this invention, the structures can be improved by the application of silicic acid on the surface preferably in combination with a filler (1 part by weight silicic acid or modified sodium silicate to 1–10 parts by weight filler) and a little organic resin (1–5 percent by weight) and after the silicic acid coating has been applied and while the coating is still wet, application can be made of a glass fiber fabric or mat or a fabric or mat formed of other fibers for adherence onto the surface to produce a composite structure upon drying which is attractive and which is resistant to deterioration at high temperature. The small amount of organic resinous component employed in the composition functions to prevent dusting and the filler operates to load the coating and to permit more uniform coverage of the surface.

Example 22

It has been found that by the use of silicic acid or a modified sodium silicate as a binder, a paper can be manufactured of glass fibers in which all the materials present are inorganic in character. Application of the silicic acid to the glass fibers in paper formation can be made similarly to that employed for the application of ordinary resinous binders but improved results are secured in the case of glass fibers because the silicic acid is able to effect a natural and strong bonding relationship with the glass fibers without attack or deterioration of the fibers and without handicapping the properties available in the fibers for use in paper manufacture. Such papers can be used as tea bags and as wrappers exposed to high temperature because of the inertness of the materials present. The amount of silicic acid required to hold the fibers in the paper depends greatly upon the length and the diameter of the glass fibers and their interfelted relation. In general, an amount of silicic acid ranging from about 0.5–5 percent by weight based upon the final product is sufficient. The binder may be incorporated in the furnish or else applied after the fibers have been deposited on the forming screen.

Example 23

In the manufacture of bonded wool products, a new and novel system has been developed which is based upon the combination of glass wool fibers with an aluminite cement. This type of cement requires a long time (about 8 hours) to set under controlled conditions of humidity or steam. It is important therefore to make use of a binder which operates immediately to retain the fibers in the shape of the molded produce until the cement is set but the immediate operating binder should be present in a condition which does not interfere with the reactivation of the cement particles and thus it is found undesirable to make use of a binder in the character of a film former.

For the manufacture of products making use of an aluminite cement as the principal binder component, use is made of a binder resin such as phenol formaldehyde resin which is applied with the aluminite cement in particle form to the fibers in the forming hood. Instead of phenol formaldehyde resin, use can be made of a melamine formaldehyde resin, an alkyd polyester resin, a plasticized vinyl latex and the like in particle form contained in a water dispersion for introduction onto the fibers with the cement in the forming hood.

In accordance with the preferred concept of this invention, use is made of the combination of the aluminite cement and silicic acid since the silicic acid gives immediate bonding upon drying and it is not film forming so that it functions desirably to hold the fibers in the molded wool product until the cement is hydrated by the use of water, steam or saturated air to introduce the 5 percent or so of moisture required for hydration. Silicic acid can be used in addition to the organic resinous materials but it is preferred to make use of the silicic acid instead of the organic materials to produce a high temperature, inorganic insulation product. The amount of silicic acid is small by comparison with the cement, usually in the order of about 2–10 percent by weight thereof.

*Example 24*

Silicic acid can be used to advantage in the manufacture of textiles of glass fibers wherein use is made of the silicic acid in amounts of about 0.2–5 percent by weight of the fibers for use of the fabric that is formed as a high temperature insulation, such as a sleeving for electrical wires and the like. Application of the silicic acid can be made in the amounts described onto glass fiber fabrics which have been weave set and relaxed by heat treatment for from 15 seconds to about 5 minutes at a temperature within the range of 1050° F. to 1250° F. or a few degrees below the fusion temperature of the glass composition of which the fibers are formed. The silicic acid which sets upon drying on the heat treated glass fibers functions to protect the fibers in the manner of a size to prevent destruction by abrasion and thereby provides a textile having good hand and feel which can be used for exposure to high temperatures or even a high flame without deterioration. Similarly silicic acid can be applied alone or in combination with a coupling agent and/or lubricant onto rovings, strands and yarns of glass fibers which are to be chopped into shorter lengths for use in the manufacture of molding compounds, reinforced plastics or laminates, or nonwoven fabrics and the like. The silicic acid bonds the fibers to hold the fibers together in the chopped rovings and at the same time the silicic acid enhances the anchorage of applied materials.

While description herein has been made specifically of inorganic binder and coating systems based upon the use of silicic acid or on the use of sodium silicate modified to buffer the sodium ion and provide silicic acid as the base of the binder, and which can make use of fillers and salts of glass forming elements, it will be apparent that the specific system described represents one phase of the broad base for fabrication of a coated or bonded glass fiber structure having good heat stability because of the presence of a stable, inorganic binder which strongly adheres to the glass fiber surfaces. The system based upon the use of silicic acid or sodium silicate is but one of the systems of metal oxides formed in cure to produce the type of glass in a binder by which improved products of glass fibers can be made available. Other systems within this broad phase can be formulated to produce coating and binder compositions for use with glass fibers in the manufacture of various types of products some of which will have lower temperatures for cure while others will be higher and some of which will react to form a layer on the glass surface while other will react to become a part of the glass surface and provide a modified surface resistant to attack or deterioration.

While description has been made to the use of the binder composition in the treatment of glass fibers, it will be apparent that the system described can be employed to modify the surface characteristics of films of glass or to bond films of glass together in the formation of laminates or other composite structures or to fabricate a structure of a combination of glass films and glass fibers or fabrics, and it will be understood that the system described will also be capable of somewhat similar reactions with other siliceous fibers and materials such as rock wool fibers, asbestos fibers, micaceous films and the like.

Alkali silicates and silicic acid itself are not compatible with all acid salts and compounds of the glass forming metals. For instance, sodium silicate is not compatible with zinc sulfate, zinc phosphate, zinc chloride, magnesium chloride, calcium chloride and the like. In these cases, separate application of the incompatible ingredient of the binder can be made to obtain the results desired. For example, an acid salt is applied to glass fibers in the forming hood or by saturation, the salt is set with heat, and then an application of sodium silicate or a modified sodium silicate binder is applied to the fibers. The reverse is possible also; the sodium silicate or a modified sodium silicate binder can be applied to the glass fibers followed by an acid or acid salt treatment.

It will be understood that changes may be made in the details of formulation, application and treatment as hereinbefore described, without departing from the spirit of the invention, especially as defined in the following claims.

What is claimed is:

1. Glass fibers and a binder on the glass fiber surfaces consisting essentially of the product of the thermal reaction on the glass fiber surfaces between elements which are present in the glass composition of which the fibers are formed, sodium silicate and a compound selected from the group consisting of boric acid, a borate and an acid salt of boric acid, in which the materials are present in the ratio of 1 part by weight of sodium silicate to 0.5 to 10 parts by weight of the compound.

2. Glass fibers and a binder on the glass fiber surfaces consisting essentially of the product of the thermal reaction on the glass fiber surfaces between elements which are present in the glass composition of which the fibers are formed, sodium silicate and a compound selected from the group consisting of boric acid, a borate and an acid salt of boric acid in which the materials are present in the ratio of 1 part by weight of sodium silicate to 0.5 to 10 parts by weight of the compound and in which the sodium silicate has a sodium to silica ratio of less than 1:10.

3. Glass fibers and a binder on the glass fiber surfaces consisting essentially of the product of the thermal reaction on the glass fiber surfaces between elements which are present in the glass composition of which the fibers are formed, sodium silicate and boric acid in which the materials are present in the ratio of 1 part by weight of sodium silicate to 0.5–10 parts by weight of the boric acid and in which the sodium silicate has a sodium to silica ratio of less than 1 to 10.

4. Glass fibers and a binder on the glass fiber surfaces consisting essentially of the product of the thermal reaction on the glass fiber surfaces between elements present in the glass composition of which the fibers are formed, sodium silicate, boric acid and an inorganic filler, in which the materials are present in the ratio of 1 part of boric acid and in which the filler is present in the ratio of 1 part by weight of sodium silicate and boric acid to 1 to 10 parts by weight of the filler and in which the sodium silicate has a sodium to silica ratio of less than 1:10.

5. Bonded glass fibers as claimed in claim 4 in which the filler is a compound selected from the group consisting of silicon oxide, boron oxide and the silicates, carbonates, hydroxides and oxides of a metal selected from the group consisting of aluminum, calcium, magnesium, sodium, iron, lead, zinc, copper, cadmium, tin, antimony, barium, molybdenum and chromium.

6. Glass fibers and a binder on the glass fiber surfaces consisting essentially of the product of the thermal reaction on the glass fiber surfaces between elements present in the glass composition of which the fibers are formed, sodium silicate, boric acid and an inorganic filler, in which the materials are present in the ratio of 1 part by weight of sodium silicate to 0.5 to 10 parts by weight of boric acid and in which the filler is present in the ratio of 1 part by weight of sodium silicate and boric acid to 1 to 10 parts by weight of the filler.

7. Glass fibers and a binder on the glass fiber surfaces consisting essentially of the product of the thermal reaction on the glass fiber surfaces between elements present in the glass composition of which the fibers are formed, sodium silicate, boric acid and a siliceous filler in which the materials are present in the ratio of 1 part by weight sodium silicate to 0.5–10 parts by weight of boric acid and in which the filler is present in the ratio of 1 part by weight of sodium silicate and boric acid to 1–10 parts by weight of the filler and in which the sodium silicate has a sodium to silica ratio of less than 1 to 10.

References Cited in the file of this patent

UNITED STATES PATENTS

| | | |
|---|---|---|
| 741,592 | Roberts | Oct. 13, 1903 |
| 798,260 | Bristol | Aug. 29, 1905 |
| 1,266,618 | Patterson | May 21, 1918 |
| 1,941,990 | Lindstrom | Jan. 2, 1934 |
| 2,347,733 | Christensen | May 2, 1944 |
| 2,428,752 | Hewett | Oct. 7, 1947 |
| 2,481,390 | Campbell | Sept. 6, 1949 |
| 2,570,830 | McCarthy | Oct. 9, 1951 |
| 2,588,389 | Iler | Mar. 11, 1952 |
| 2,601,235 | Alexander et al. | June 24, 1952 |
| 2,650,200 | Iler et al. | Aug. 25, 1953 |
| 2,664,405 | Anderson et al. | Dec. 29, 1953 |
| 2,734,835 | Florio et al. | Feb. 14, 1956 |
| 2,930,106 | Wrotnowski | Mar. 29, 1960 |

OTHER REFERENCES

"Handbook of Chemistry and Physics," 35th Edition 1953–54, Chemical Rubber Publishing Co., Cleveland, Ohio.